United States Patent
Kellerman et al.

(10) Patent No.: US 6,750,887 B1
(45) Date of Patent: Jun. 15, 2004

(54) GRAPHICAL USER INTERFACE LAYOUT MANAGER

(75) Inventors: Terry K. Kellerman, Fremont, CA (US); Philip S. Milne, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 314 days.

(21) Appl. No.: 09/585,946

(22) Filed: Jun. 2, 2000

(51) Int. Cl.[7] .............................................. G06F 17/30
(52) U.S. Cl. ...................................... 345/788; 345/967
(58) Field of Search ................................ 345/967, 788; 345/801–805; 717/125, 105

(56) References Cited

U.S. PATENT DOCUMENTS

| | | | | |
|---|---|---|---|---|
| 5,418,950 A | * | 5/1995 | Li et al. ........................ 707/4 |
| 5,513,342 A | * | 4/1996 | Leong et al. | |
| 5,546,525 A | * | 8/1996 | Wolf et al. .................. 345/809 |
| 5,555,369 A | * | 9/1996 | Menendez et al. .......... 345/762 |
| 5,588,099 A | * | 12/1996 | Mogilevsky et al. ....... 707/508 |
| 5,671,378 A | * | 9/1997 | Acker et al. | |
| 5,760,772 A | * | 6/1998 | Austin | |
| 5,796,401 A | * | 8/1998 | Winer ......................... 345/619 |
| 5,886,694 A | * | 3/1999 | Breinberg et al. .......... 345/788 |
| 5,909,214 A | * | 6/1999 | Consolatti et al. | |
| 6,002,867 A | * | 12/1999 | Jazdzewski ................. 717/105 |
| 6,046,740 A | * | 4/2000 | LaRoche et al. | |
| 6,133,914 A | * | 10/2000 | Rogers et al. ............... 345/661 |
| 6,215,502 B1 | * | 4/2001 | Ferguson ..................... 345/648 |
| 6,249,284 B1 | * | 6/2001 | Bogdan ........................ 345/764 |
| 6,335,743 B1 | * | 1/2002 | Owings ....................... 345/801 |
| 6,356,279 B1 | * | 3/2002 | Halstead et al. ............ 345/619 |
| 6,392,673 B1 | * | 5/2002 | Andrew et al. | |
| 6,411,959 B1 | * | 6/2002 | Kelsey ........................ 707/101 |
| 6,414,698 B1 | * | 7/2002 | Lovell et al. ............... 345/800 |
| 6,473,093 B1 | * | 10/2002 | Halstead et al. ............ 345/619 |

OTHER PUBLICATIONS

Peter Wright Beginning Delphi 2, May 1, 1996, Wrox Press Limited, pp. 44, 92, 93.*

* cited by examiner

*Primary Examiner*—Cao (Kevin) Nguyen
(74) *Attorney, Agent, or Firm*—Beyer Weaver & Thomas LLP

(57) ABSTRACT

A method for managing the construction or creation of a user interface in a Java™ environment is described. Values for a set of internal client properties are derived and attach to a new component. A component is brought into a container, or user interface area, from a component palette. Using the client properties, size values and position values are calculated for the component, all of which are integer values. This feature simplifies the calculation process. If there are existing components in the user interface, values for the other components are recalculated using the same set of client properties (with different values) and the same set of size and position formulas. This way any resizing and repositioning of components are done automatically. Once the client properties are derived, they are stored with the component. A user interface having multiple components can then be reconstructed from state data in the components.

21 Claims, 6 Drawing Sheets

GRAPHICAL USER INTERFACE LAYOUT MANAGER

BACKGROUND OF THE INVENTION

1. Field of the Invention

The present invention relates generally to graphical user interface design and programming. More specifically, it relates to computer software for managing the construction of a GUI in a JAVA™ programming environment.

2. Discussion of Related Art

Designing an efficient and ergonomic user interface is an integral stage of most application development projects. The graphical user interface ("GUI") is what the user sees and interacts with. The GUI must present information and choices to a user in a way that is not only pleasing and natural to the eye but conducive to efficient use of the underlying application. Thus, designing an effective GUI can take significant time and resources, not only in the actual design of the GUI but in simply trying different configurations and layout, often "on the fly," and actually seeing what works on the screen.

However, most GUI layout managers are difficult to work with and have several drawbacks. None have the flexibility, robustness, and simplicity needed to easily layout visual components in a GUI in a pleasing and resizable arrangement with a minimum of developer effort. Some are flexible and give the GUI designer many options, but are difficult to use and require too much time from the designer. These include GridBagLayout Layout Manager and BorderLayout Layout Manager.

For example, although GridbagLayout is a powerful layout manager in Java™ application programming, developers must create and specify a GridBagConstraints object before a component can be added to a container. The elements of a GridBagConstraints object are complex and not easily understood. Use of a GUI to specify a GridBagLayout easily is virtually impossible, forcing developers to hand code the placement of the components (e.g., buttons, text labels, etc). In other words, developers cannot "drag and drop" components directly into the layout manager. BorderLayout is also flexible and allows components to be aligned at the center or north, south, east, and west sides of a container. However, it has no concept of placing components anywhere else, and requires nesting containers several layers deep to do certain tasks. BorderLayout can only respect one dimension of a preferred size of a component for the north, south, east, and west alignments; for center, the preferred size is completely ignored. In addition, both layout managers are difficult to understand for new users.

Other layout managers are simple to use but have limited abilities, such as FlowLayout and GridLayout. For example, FlowLayout adheres to a component's natural preferred size and lays components out from left to right, one after another. However, components are not aligned in the vertical direction, and resizing the container can cause components to shift row or columns. With GridLayout, and another layout manager, BoxLayout, components are forced into cells having the same size.

In addition to the individual drawbacks of each of the layout managers, converting from one layout manager to another is difficult. The best that can be done presently is capturing the current size and position of a component within its container. There is no process among the layout managers to capture the way a component changes its size or position when the container is resized. Furthermore, existing layout managers have complex internal state data that attaches to a GUI that must be saved to persistent storage and restored. For example, with FlowLayout it may be the alignment and gap sizes, or the rows, columns, and gap sizes for GridLayout, or a host of variables for GridBagLayout. In addition, layout specific constraint objects may also need to accompany each component in the GUI.

Another drawback of existing layout managers, notably in the more powerful ones, is the lack of a constraintless add function, which forces designers to layout components using programming code, rather than using a graphical layout tool. FlowLayout and BoxLayout allow a constraintless add function, but FlowLayout does not align in the vertical direction and BoxLayout forces everything to be the same size.

Therefore, it would be desirable to have a layout manager that is easy and intuitive to use without sacrificing flexibility, robustness, and power. It should allow a user to position and size components, using a drag and drop process, as desired, without limitations and constraints that prevent designing an optimal GUI with reduced time and effort from the designer. It would also be desirable to have a layout manager that is stateless such that state data is contained in the individual components and one that can optionally conform to Java™ look and feel guidelines.

SUMMARY OF THE INVENTION

To achieve the foregoing invention, methods, apparatus, and computer-readable media are disclosed for managing the construction or creation of a user interface. In one aspect of the invention, a method of managing the creation of a user interface involves deriving values for a set of internal client properties that attach to a new component. A component is brought into a container, or user interface area, from a component palette. Using the client properties, size values and position values are calculated for the component. The calculations are done using integer values only, thereby simplifying the calculation process. If there are existing components in the user interface, values for the other components are recalculated using the same set of client properties (with different values) and the same set of size and position formulas. This way any resizing and repositioning of components are done automatically. Once the client properties are derived, they are stored with the component. A user interface having multiple components can then be reconstructed from state data in the components.

In another aspect of the present invention, a method of representing a component in a user interface is describe. The component has a position and size in the user interface, which, in turn, has multiple columns that have a particular column type. In one embodiment, struts and springs define column and row types. A fixed strut or spring allows a developer how wide or tall a component should be. A spring allows for the area of a component to be dynamic. A set of internal client properties is associated with the component when the component is first brought into the user interface. Each property value can be represented as an integer. The particular column type, as well as a row type for the multiple rows in the user interface, can be inferred form the set of client properties. The client property values are also used to derive position values and size values for the component. The size and position values are also integer values and can be derived easily from the client property values. The component is encapsulated with the set of properties and the size and position values before being stored.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Designing and programming a graphical user interface ("GUI") has typically been an inefficient and difficult task. Simply stated, there is yet a programming language that has made GUI design and creation flexible and robust, and at the same time simple to use. The present invention has a user layout component referred to as a customizer and an underlying program, referred to as a manager, that uses a mathematical model for performing the operations by a GUI designer using the customizer. The layout customizer enables a Java™ developer to quickly create complex and ergonomically pleasing GUI or layout that the layout manager can use. It features a point-and-click, drag-and-drop style of interface. Both the layout customizer and layout manager address the problem of laying out visual components of a GUI in a pleasing and resizable arrangement with minimum developer effort.

Figure 2A:
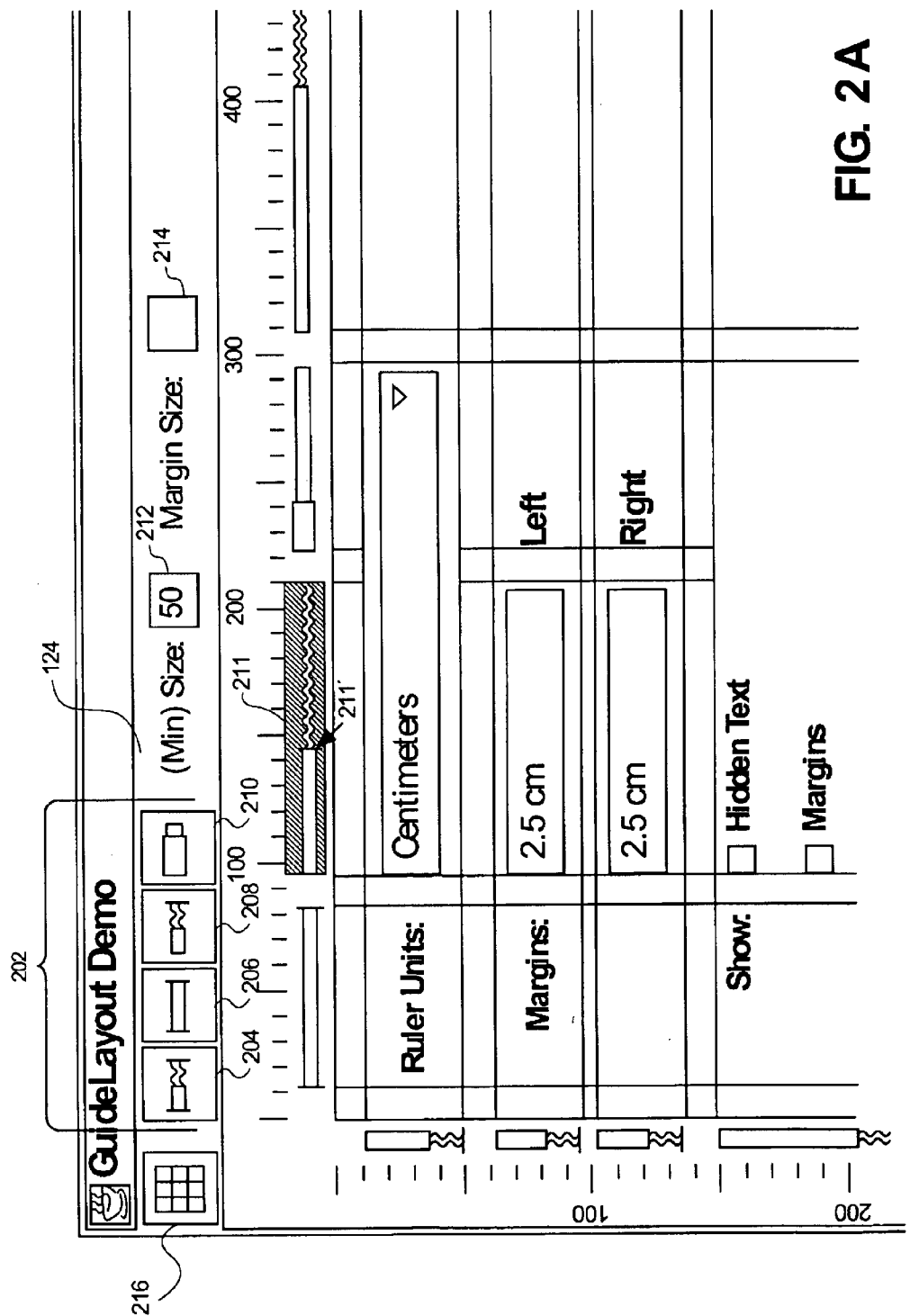
FIG. 2A is a segment of a screenshot showing one set of content for a toolbar in accordance with one embodiment of the present invention.

The layout customizer of the present invention gives a GUI designer multiple features such as 16 alignment styles, single-click addition of rows and columns, preferred sizing, automatic adjustment of positions and sizes when resizing, point-and-click and drag-and-drop construction (constraintless add function), and powerful and intelligent defaulting capabilities. In addition, its layout manager does not have to store state data to persistent storage. This is because all layout information is encapsulated in the components themselves, and therefore the state of the layout is reconstructable from persistent storage by analyzing those components. The layout customizer can also create itself from persistent storage by analyzing the components inside a container having this layout manager. In the described embodiment, the layout customizer essentially allows the GUI designer to customize or set 15 internal numeric layout values for each component. But unlike other approaches, 13 of these values are specified not painstakingly and numerically, but automatically through either defaults or by using the drag-and-drop, point-and-click visual user interface. Only if the user decides to force a numeric fixed width or height is input required to be typed by the designer, as is shown in FIG. 2A below.

The layout customizer "lays out" components that make up a user interface. Very few existing customizers have features referred to as springs and struts, explained below, but do not take complete advantage of them. Struts and springs define column and row types. A fixed strut allows a developer to specify exactly how wide or tall a component can be. A spring allows the area for a component to be dynamic. In the Java™ platform, a component has a preferred size, i.e., how long or tall a component would like to be. In the present invention, the concept of preferred size springs and struts using a Java™-specific infrastructure is introduced. As will be described in greater detail below, a preferred size strut specifies that all components in that row or column will have at least their desired amount of height or width. A preferred spring specifies a minimum width or height based on the components' preferences, but allows the width or height to be dynamic.

Figure 1:
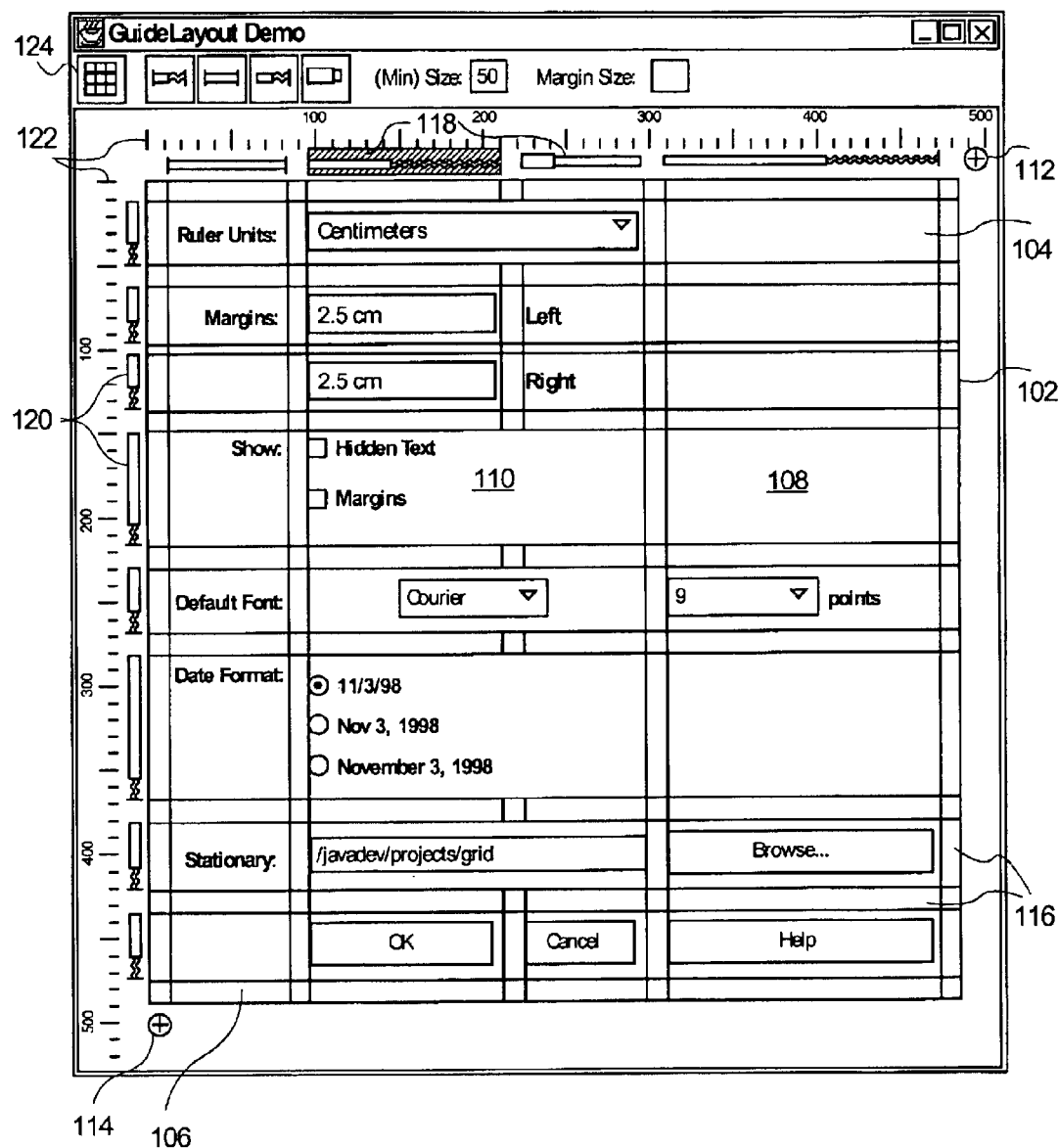
FIG. 1 is a screenshot of a layout customizer in accordance with one embodiment of the present invention.

FIG. 1 is a screenshot of a layout customizer in accordance with one embodiment of the present invention. The overall view of the layout customizer is based on a row and column configuration. The rows and columns are shown in user interface area 102 having the black border. A row is shown by horizontal area 104 and a column by vertical area 106. User interface area 102 has four apparent columns and eight apparent rows. An intersection of a column and row creates a cell, such as cell 108. Some cells are more than one column wide or one row high. For example, cell 110 is one row high but two columns wide. As will be described in greater detail below, the rows and columns do not default to the same size. Instead, the preferred size of the components sets the default. Additional columns can be added by clicking on icon 112 and additional rows can be added by clicking on icon 114. A component is an item that is placed in one or more contiguous cells. As is known in the field of GUI design and programming, a component can be one of various data types such as text labels, buttons, combo boxes or text fields, to name just a few examples. Components are typically chosen by the GUI designer from a palette of component types placed completely outside the user interface area shown in FIG. 1. With the present invention, components can be clicked on from the palette and then drag and dropped into area 102. They can be stretched to span multiple rows and columns.

Also part of user interface area 102 are margins. Margins are the spaces between the rows and columns and the space along the inner edge of area 102, also referred to as a border, such as spaces 116. In the described embodiment, the margins and borders are based on the recommended Java™ Look and Feel guidelines and are shown by default but can be turned off. Margins are implemented using fixed strut rows and columns. They can be changed by clicking on the margin to highlight it and then entering a pixel value in a text field, described below.

Outside user interface area 102, icons are used to show the type of a particular row or column. In the described embodiment, a row or column can be one of four types. These are described in FIG. 2A. The icons or graphical symbols for these types are displayed along the vertical and horizontal sides of area 102. Two examples of a column type are shown as icons 118. Two examples of row types are shown as icons 120. Notice that the length of each icon is the same as the width or height of the corresponding row or column. An icon for a fixed strut for each of the margins is not shown. Also along the same two sides of user interface area 102 are two rulers 122 indicating the number of pixels in a given space. Along the top of the screen is a toolbar 124 that contains several icons and text fields for entering data.

FIG. 2A is a segment of a screenshot showing one set of content for toolbar 124 in accordance with one embodiment of the present invention. The content set of toolbar 124 shown in FIG. 2A includes four icons 202 that represent the four row/column types, one of which can be assigned to a row or column. Notice that icons 118 and 120 from FIG. 1 can be found in icon set 202. The first icon 204 represents a fixed spring. For example, column two is controlled by a fixed spring. Icon 206 represents a fixed strut. The first column is controlled by a fixed strut. Struts represent rows and columns that are fixed in size during container resizing (as mentioned above, a special example of this is the margins and borders). A size assigned to a fixed strut row or column does not change. Thus, if a GUI designer knows that a particular column should never be greater or less than 80 pixels wide, that column can be a fixed strut of 80 pixels. Horizontal span indicator and vertical span indicator are designated by reference numbers 260 and 262 respectively.

Icon 208 represents a preferred spring. All the rows in user interface area 102 are preferred springs, as is the fourth column. A preferred spring row or column conforms to the maximum preferred height or width of the components contained in that row or column. A preferred spring row or column can expand when the enclosing container or user interface area 102 resizes. However, the row or column will not shrink below the preferred size. A preferred spring row or column does not necessarily mean that the component in that column and row will increase in size; the spacing around it may increase instead. As is described below, several attachment/alignment types that can be assigned to a component conform to the preferred size in both directions. Icon 210 represents a preferred strut. The third column is controlled by a preferred strut. Preferred struts also respect the preferred size of their contained components. However, they do not resize when the enclosing container or user interface area 102 resizes. A preferred strut column (or row) may increase in width (height) if a new component added to the column (row) has a preferred width (height) larger than any existing component in that column (row). Similarly, a preferred strut row or column may decrease in size if the largest component in a row or column is deleted or moved elsewhere. A component in a row or column having a preferred spring or preferred strut type cannot shrink below the "fixed" portion of the spring or strut. In FIG. 2A, the minimum length of preferred spring 211 is the delimiter 211'. The corresponding column cannot shrink past point 211'

Also shown in toolbar 124 is a text field 212 in which a user can enter the minimum number of pixels for a row or column. The "Min" is in parenthesis since in the case of a fixed strut, there is no minimum or maximum length, but only a fixed length for the column. Also shown is an input box 214 in which the GUI designer can enter the size of the margins. In another embodiment, text field 214 will not be included and text field 212 will be used to enter the fixed size. Also shown to the far left of toolbar 124 is a grid hide/display icon 216. When ON or highlighted, as shown in FIG. 2, grid lines showing the margins and cells are displayed. This is useful for the GUI designer when constructing the user interface. However, the end user of the application does not have to see the grid lines and the feature is turned off. An example of this is shown in FIG. 3.

Figure 3:
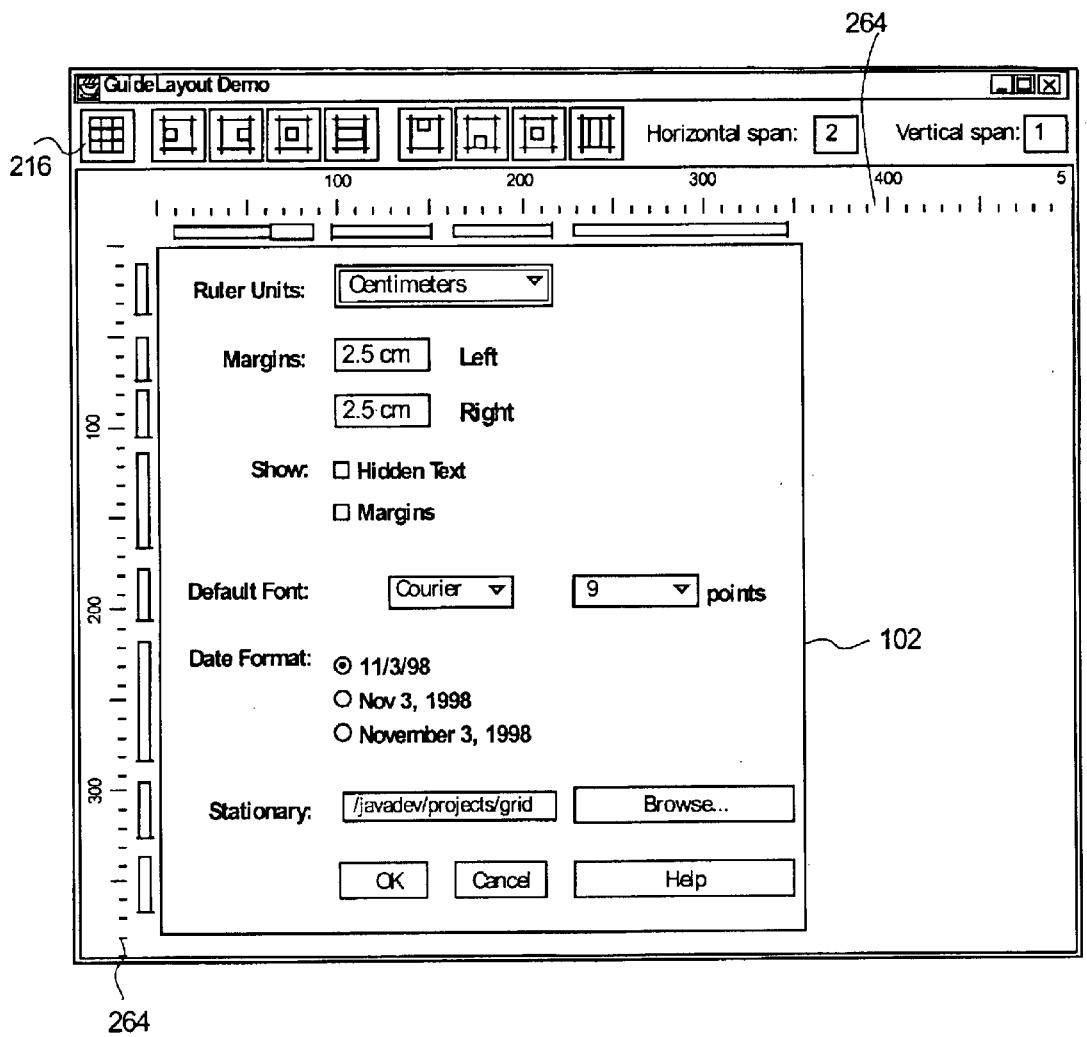
FIG. 3 is a sample screenshot of a user interface in runtime mode without the grid being displayed in accordance with one embodiment of the present invention.

In FIG. 3, icon 216 is not highlighted indicating that the grid lines are not displayed. This can be seen in user interface area 102, which is more pleasing and less cluttered to the eye, which is typically one of the goals of the end user experience, specifically, for presenting a user interface to an end user. When the grid lines are not shown, the user interface design and construction cannot be modified, but clicking on the components would actually operate the user interface (i.e., buttons actually depress, an end-user can type into the text fields, check boxes can be checked and unchecked.) In other words, the user interface is in runtime mode as opposed to design mode. Thus, when the grid is OFF, a click in a cell can activate the underlying component itself; when the grid is ON, the cell is highlighted and the icons change to attachment style icons, described below. Furthermore, clicking on a spring or strut icon only works when the grid is OFF. Grid lines 264 denote the grid lines in the component area.

Figure 2B:
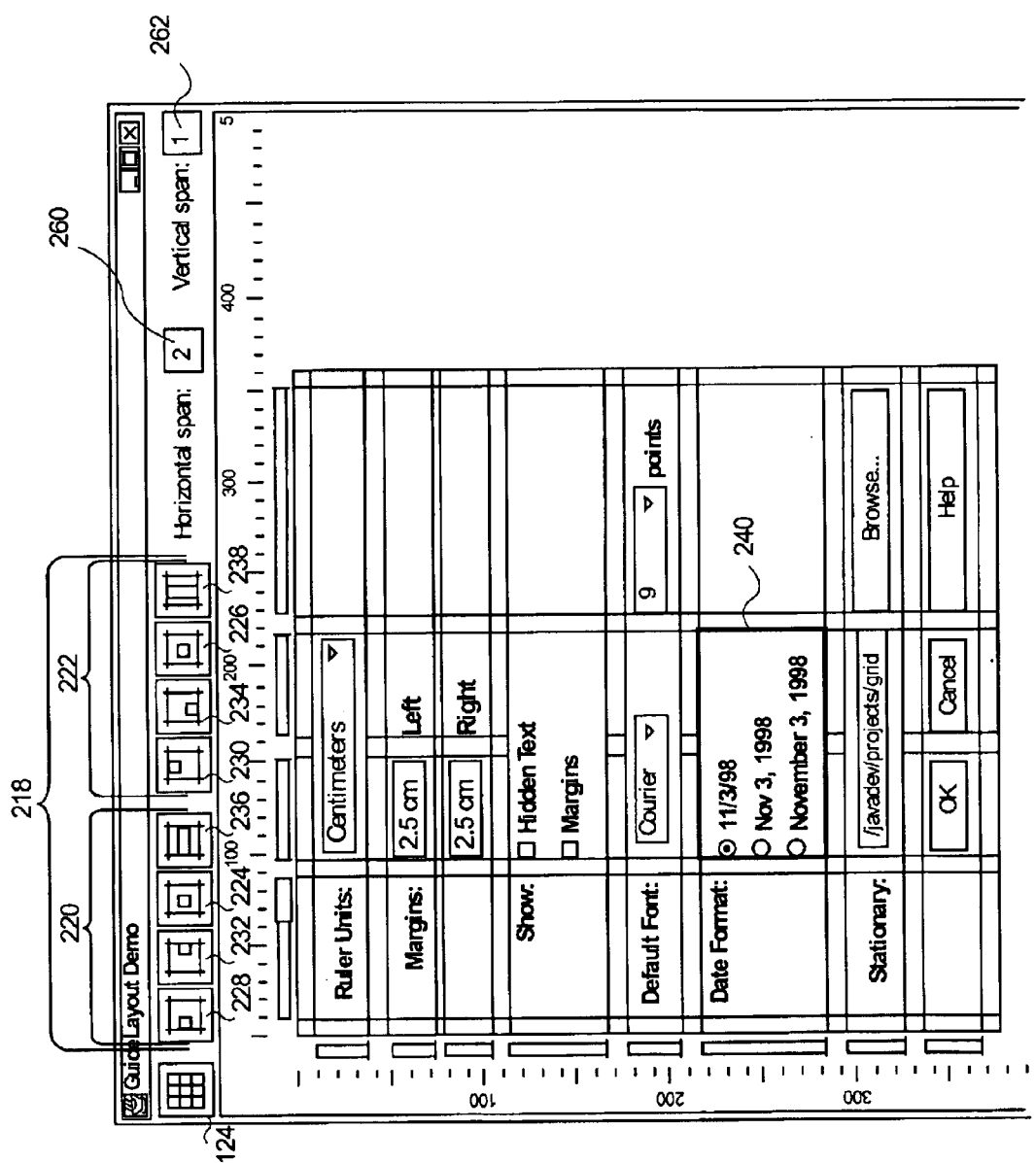
FIG. 2B is a segment of a screenshot showing another set of content for a toolbar in accordance with one embodiment of the present invention.

FIG. 2B is a segment of a screenshot showing another set of content for toolbar 124 in accordance with one embodiment of the present invention. The content set of toolbar 124 shown in FIG. 2B includes a set of eight icons 218, divided into two groups of four icons: east-west icon set 220 and north-south icon set 222. Icon set 218 represent attachment/alignment options that the GUI designer can use to arrange the content of a component, such as right justifying a text label, left justifying a checkbox component, or centering a the label of a button. In the described embodiment, there are 16 different alignment options, all of which are made easily available to the developer through icon set 218. As is described in greater detail below, the developer chooses one option from east-west icon set 220 and one from north-south icon set 222, giving a total of 16 alignment options.

A center alignment option centers the component in both the row and column. When chosen, the preferred size of the content is respected in both horizontal and vertical directions. It is chosen by selecting first center icon 224 from east-west icon set 220 and second center icon 226 from north-south icon set 222. In the described embodiment, it is also the default alignment for a new component. In another preferred embodiment, a top, left alignment (north-west alignment) can be a default for new components.

There are eight directional alignment options which can be referred to based on their corresponding compass points: north, south, east, west, north_east, north_west, south_east, and south_west. Each respects the preferred size in each direction, and attaches the component to either one (in the case of N, S, E, and W) or both sides (NE, NW, SE, and SW) of a cell. The following describe which icons should be selected for a particular alignment:

North (top, center border of cell): e-w icon 224 and n-s icon 230;

North_west (top, left corner): e-w icon 228 and n-s icon 230;

North_east (top, right corner): e-w icon 232 and n-s icon 230;

South (lower, center border of cell): e-w icon 224 and n-s icon 234;

South_west (lower, left corner): e-w icon 228 and n-s icon 234;

South_east (lower, right corner): e-w icon 232 and n-s icon 234;

West (left, center border of cell): e-w icon 228 and n-s icon 226; and

East (right, border of cell): e-w icon 232 and n-s icon 226.

There are also four alignment options for border layouts: border_north, border_south, border_east, and border_west. The component is attached to one side of a row/column cell which corresponds to north, south, east, and west, but extends all along the cell wall. The preferred size of the component is, thus, respected in only one dimension or direction, and allows stretching in the other. A fifth layout type can be referred to as border_border. It attaches the component to all four sides of a row/column cell, stretching and shrinking in both dimensions as the container is resized. The following describe which icons should be selected for border alignment options:

Border_north (top border): e-w icon 236 and n-s icon 230

Border_south (bottom border): e-w icon 236 and n-s icon 234

Border_west (left border): e-w icon 228 and n-s icon 238

Border_east (right border): e-w icon 232 and n-s icon 238

Border_border (full cell): e-w icon 236 and n-s icon 238

There are also border_horizontal and border_vertical options. These alignment options attach the component to opposite sides of a row/column cell in one dimension, but center the component at its preferred size in the other dimension. The component will stretch when the container resizes in the direction of the attachment. A border_horizontal attachment is possible by selecting e-w icon 236 and n-s icon 226. A border_vertical attachment is possible by selecting n-s icon 238 and e-w icon 224. The alignment of a particular component can be determined by clicking on the cell and observing which icons are highlighted. In sum, 16 attachment/alignment options have been described: one center, eight directional, and seven border.

Underlying the layout customizer is a layout manager. The layout manager is based on a linear, mathematical model which can compute position and size using a set of variables for each component and a set of equations. Through these variables and equations, position and size can be recalculated without having to use any numbers having fractions and only adjusting those variables that need to be adjusted. Calculations are made simpler while the power of the layout customizer, such as the preferred springs and struts, the 16 alignment/attachment options, and the ability to dynamically add rows and columns, has increased. The foundation of the layout manager is 15 internal variables. When a component is resized, within the constraints of its corresponding row and column type (i.e., preferred spring or preferred strut) or a new row or column is added, the 15 internal variables for that component are used to recalculate the position and size of the component.

As described above, a component can be in one of 16 alignment/attachment states. In the described embodiment, there are three ways to designate each state: number, code, and description. Each state implements from zero to four border attachments. These are described in Table 1 "Layout Constraints." Table 1 has four columns: Number, Code, Description, and Attachments. The Number column simply holds a number, from 0 to 15, that corresponds to a particular state. The Code column holds a one or two letter code representing the attachment. The letter "C" represents a center alignment and "B" stands for border and is used in combination with N, S, E, and W, and with itself in the special case of the Border_Border alignment. The Descriptive column contains a description of the attachment with respect to cell alignment and the Attachment column describes the attachment in terms of north, south, east, and west. Each of the alignment states corresponds to one of the combinations of e-w icons and n-s icons described in FIG. 2B.

TABLE 1

| Number | Code | Descriptive | Attachments |
|---|---|---|---|
| 0 | "C" | CENTER | None |
| 1 | "E" | EAST | EAST |
| 2 | "S" | SOUTH | SOUTH |
| 3 | "SE" | SOUTH_EAST | SOUTH + EAST |
| 4 | "W" | WEST | WEST |
| 5 | "BH" | BORDER_HORIZONTAL | WEST + EAST |
| 6 | "SW" | SOUTH_WEST | SOUTH + WEST |
| 7 | "BS" | BORDER_SOUTH | WEST + SOUTH + EAST |
| 8 | "N" | NORTH | NORTH |
| 9 | "NE" | NORTH_EAST | NORTH + EAST |
| 10 | "BV" | BORDER_VERTICAL | NORTH + SOUTH |
| 11 | "BE" | BORDER_EAST | NORTH + SOUTH + EAST |
| 12 | "NW" | NORTH_WEST | NORTH + WEST |
| 13 | "BN" | BORDER_NORTH | NORTH + WEST + EAST |
| 14 | "BW" | BORDER_WEST | NORTH + WEST + SOUTH |
| 15 | "BB" | BORDER_BORDER | NORTH + WEST + SOUTH + EAST |

The entries in Table 1 are generally self-explanatory. For example, Number 11, or "BE," represents Border_East, in which a component is lined up against the right border of a cell and is stretched evenly from the top to the bottom of the cell. It can be selected by highlighting e-w icon 228 and n-s icon 238. In another example, Number 15 represents the special alignment case of Border_Border which is essentially north, south, east and west. This alignment can be selected by highlighting icon 236 and icon 238.

Each component brought into a container by the GUI designer has a corresponding set of internal component client properties. In the described embodiment, there are fifteen internal client properties for each component. Not every property for each component will have a non-zero value, but each does have a default value. The client property values are used in a set of four formulas to determine the position and size of each component. The variables or properties are presented in Table 2 "Internal Client Properties". First, it should be noted that there are 15 rows in the table. The properties are named "GuideLayout." followed by a variable name: fixedX, fixedY, prefColWidth, prefRowHeight, fixedWidth, fixedHeight, connectionsType, spanCols, spanRows, var2×Cols, var2×Rows, var2×ColPosition, var2×RowPosition, var2×ColWidth, and var2×RowHeight. The other columns in Table 2 include Description and {default}. The Description column contains information on what the property represents, and the {default} column shows the default value.

TABLE 2

| Name (GuideLayout.) | Description | {default} |
|---|---|---|
| fixedX | total fixed position offset of this component from the leading (left) border | 0 |
| fixedY | total fixed position offset of this component from the leading (top) border | 0 |
| prefColWidth | current preferred width sizing this component | pref. width |
| prefRowHeight | current preferred height sizing this component | preferred height |
| fixedWidth | fixed width or fixed minimum width imposed on this component | −1 (inactive) |

TABLE 2-continued

| Name (GuideLayout.) | Description | {default} |
|---|---|---|
| fixedHeight | fixed height or fixed minimum height imposed on this component | −1 (inactive) |
| connectionsType | Symbolic attachment/attachment constant (see above) | 0 ("Center") |
| spanCols | number of columns spanned by the component | 1 |
| spanRows | number of rows spanned by the component | 1 |
| var2xCols | variable-width column halves = 2 * number of variable width columns | 2 |
| var2xRows | variable-height row halves = 2 * number of variable height rows | 2 |
| var2xColPosition | position in number of variable-width column halves | 1 |
| var2xRowPosition | position in number of variable-height row halves | 1 |
| var2xColWidth | width in even number of variable-width column halves | 0 |
| var2xRowHeight | height in even number of variable-height row halves | 0 |

Starting with the first row, GuideLayout.fixedX helps to determine the horizontal position (but there is also a variable component). It represents the total fixed width offset of the component from the leading left side border of the container, i.e., user interface area 102, and has a default value of zero. The next property, GuideLayout.fixedY helps determine the vertical position of the component. It represents the total fixed height offset of the component from the leading top border and also has a default value of zero. The next two variables, GuideLayout.prefColWidth and GuideLayout.prefRowHeight, are for horizontal and vertical sizing and represent the current preferred width and height sizing the component, respectively. They have default values of the component's own preferred width and preferred height, but in general would represent the widest component width in the column or the tallest component height in the row.

The remaining 11 properties are described similarly in Table 2. One variable that deserves special mention is GuideLayout.connectionsType. This property represents the attachment/alignment type as described in FIG. 2B. There are 16 different alignment types and the value for GuideLayout.connectionsType is an integer between zero and 15. This number corresponds to an entry in Table 1, which describes the 16 different alignment options. It defaults to "0" which is the center alignment type. It should be noted that the value for any of the client properties is always an integer. This makes calculations for position and size significantly less complex and much faster. Each component, when clicked on from a component palette and dragged and dropped into a container by the GUI designer, is assigned a value for each of the fifteen properties.

Figure 4:
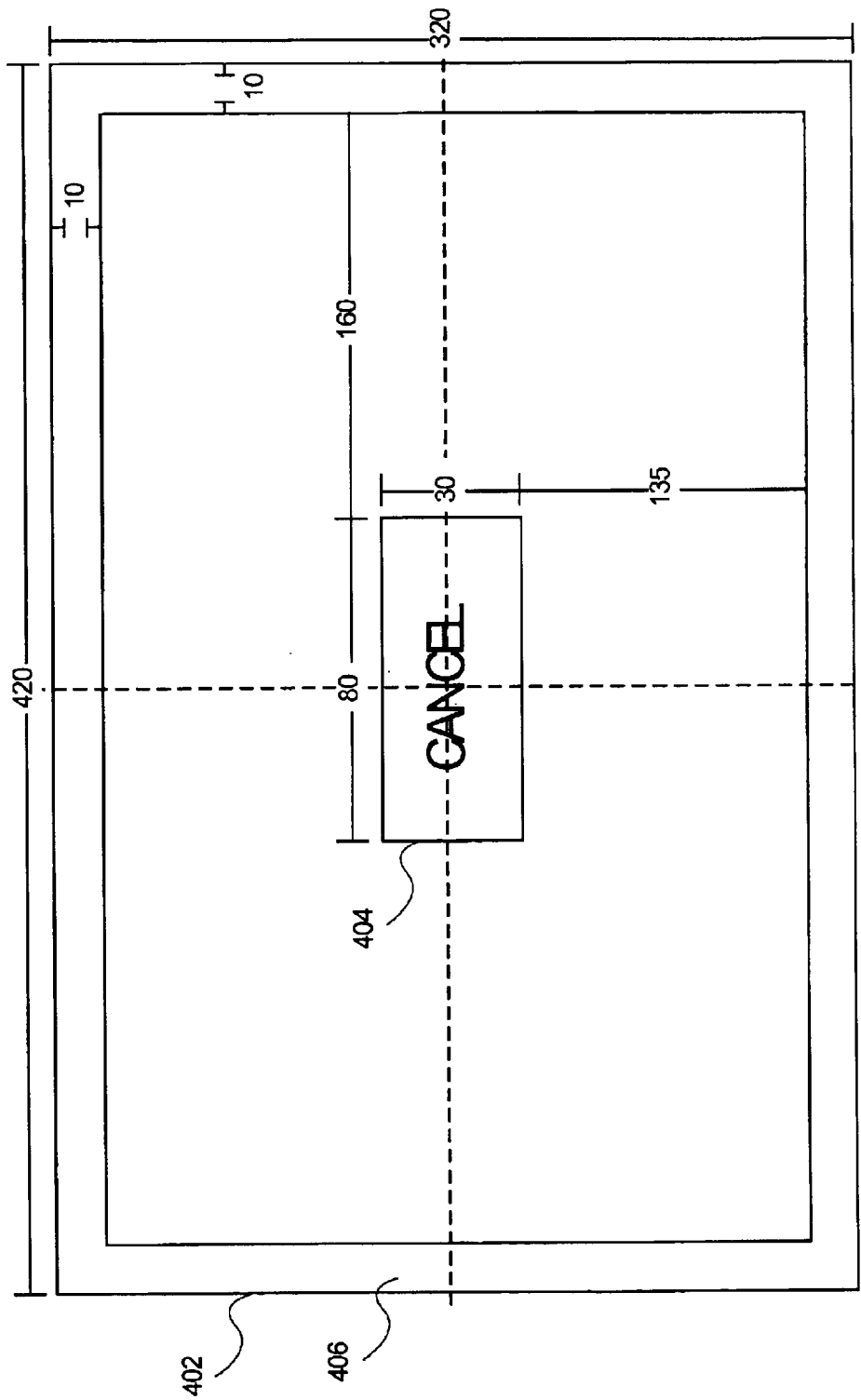
FIG. 4 is an illustration of a sample first component placed in a container in accordance with one embodiment of the present invention.

FIG. 4 is an illustration of a sample first component placed in a container in accordance with one embodiment of the present invention. The component placed in container 402 is a CANCEL button 404. Container 402 has a horizontal span of 420 pixels and a vertical span of 320 pixels, with a 10 pixel border or margin 406 all around. CANCEL button 404 is 80 pixels long and 30 pixels high. When component 404, or any other component, is placed in container 402, component 404 defaults to the center of container 402. The length from the left or right edge of button 404 to the inner border of container 402 is 170 pixels and the length from the top or bottom edge to the inner border is 145 pixels. Because this is the first component in container 402, there is one row and one column. In the described embodiment, the row and column types default to preferred spring. The property values for CANCEL button component 404 are shown below:

GuideLayout.fixedX=50 pixels (10 left margin+40 half-width)
(Center point required for a centered component.)
GuideLayout.fixedY=25 pixels (10 top margin+15 half-height)
(Center point required for a centered component.)
GuideLayout.prefColWidth=80 pixels
GuideLayout.prefColHeight=30 pixels
GuideLayout.fixedWidth=−1 (inactive, preferred size is used instead)
GuideLayout.fixedHeight=−1 (inactive, preferred size is used instead)
GuideLayout.connectionsType=0 (symbolic constant for Center)
GuideLayout.spanCols=1 column
GuideLayout.spanRows=1 row
GuideLayout.var2xCols=2 column halves
(Because there is 1 variable width column)
GuideLayout.var2xRows=2 row halves
(Because there is 1 variable width row)
GuideLayout.var2xColPosition=1 column half
(0=left, 1=center, 2=right)
(Can be higher numbers if more than one column.)
GuideLayout.var2xRowPosition=1 row half
(0=top, 1=middle, 2=bottom)
(Can be higher numbers if more than one row.)
GuideLayout.var2xColWidth=0 column halves
(Would be 2 if attached to West and East borders)
GuideLayout.var2xRowHeight=0 column halves
(Would be 2 if attached to North and South borders)

Each component is positioned and sized once in the container. Placing it in the container may effect the position and size of other components. Essentially, a re-positioning and re-sizing of all existing components is performed when a new component is placed in the container. However, the necessary calculations for doing this have been greatly simplified using the 15 described client properties of Table 2. The variables are used by the layout manager in formulas for determining position and size are as follows:

$x=(\text{var2xColPosition}/\text{var2xCols})*W+\text{fixed}X$ $y=(\text{var2xRowPosition}/\text{var2xRows})*H+\text{fixed}Y$ $\text{width}=(\text{var2xColWidth}/\text{var2xCols})*W+(\text{fixedWidth}>-1?\text{fixedWidth}:\text{prefColWidth})$ $\text{height}=(\text{var2xRowHeight}/\text{var2xRows})*H+(\text{fixedHeight}>=-1?\text{fixedHeight}:\text{prefRowHeight})$ where W=total variable width part of all columns (total spring width) and H=total variable height part of all rows (total spring height)

The variables on the right side of the formulas correspond to the properties in Table 2. The variables on the left are the variables needed to determine the position and size of the components. The x and y variables are for the horizontal and vertical positions, respectively, increasing from the left and top respectively. The W and H variables are for the width and the height. The upper case represents the total variable width part of all columns (total spring width). The upper case H variable represents the total variable width part of all rows (total spring height). Values for these two variables are dependent on how much the container has been stretched. The values for the variables are read from the components. The calculations for x,y, width, and height can be re-done easily for each component in the container as needed whenever a new component is added or removed, a row/column is added or removed, a row/column type is changed, an attachment type is changed, a component is moved, a component row or column extent is changed, a row/column's fixed size is changed, or the container is resized. The formulas are expressed in Table 3.

TABLE 3 x = (var2xColPosition/var2Xcols) * W + fixedX
y = (var2xRowPosition/var2xRows) * H + fixedY
width = (var2xColWidth/var2xCols) * W +
(fixedWidth > −1 ? fixedWidth:prefColWidth)
height = (var2xRowHeight/var2xRows) * H +
(fixedHeight >= −1 ? fixedHeight:prefRowHeight)

Following the example from FIG. 4, CANCEL button component 404 will have the following position and size values:

W=320 (The amount the container has been stretched, 160+160.)

H=270 (The vertical stretching, 135+135)

x=(1/2)*320+50=210 y=(1/2)*270+25 =160 width=(0/2)*320+(80)=80 height=(0/2)*270+(30)=30

The values for each of these four variables, as well as the 15 properties, are also attached or associated with each component and is serialized to persistent storage with each component. The components can be deserialized to retrieve client property values of the components which can be used to infer the row and column sizes and types. For example, the fact that fixedWidth and fixedHeight are both −1 and the fact that connectionsType=0 and var2xCols and var2xRows=1, and var2xColPosition and var2xRowPosition both are not zero specifically imply that the row and column types are both preferred springs and that the alignment/attachment type is CENTER.

As mentioned above, the layout manager does not have to store any state information, i.e., it is a stateless layout manager. All the state data needed to reconstruct the GUI are embedded in the components themselves; upon deserialization, each component knows where to place itself in a container based on its client properties and values calculated using the size and position formulas. Thus, the layout manager itself does not need to be saved to or restored from persistent storage. Components can be dragged and dropped into a container since the container itself does not have to specify any constraints and the behavior of the components within the container is reconstructable from the components themselves. However, the layout customizer has a minimum amount of state data internally for efficiency and is reconstructable from the components themselves.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 5:
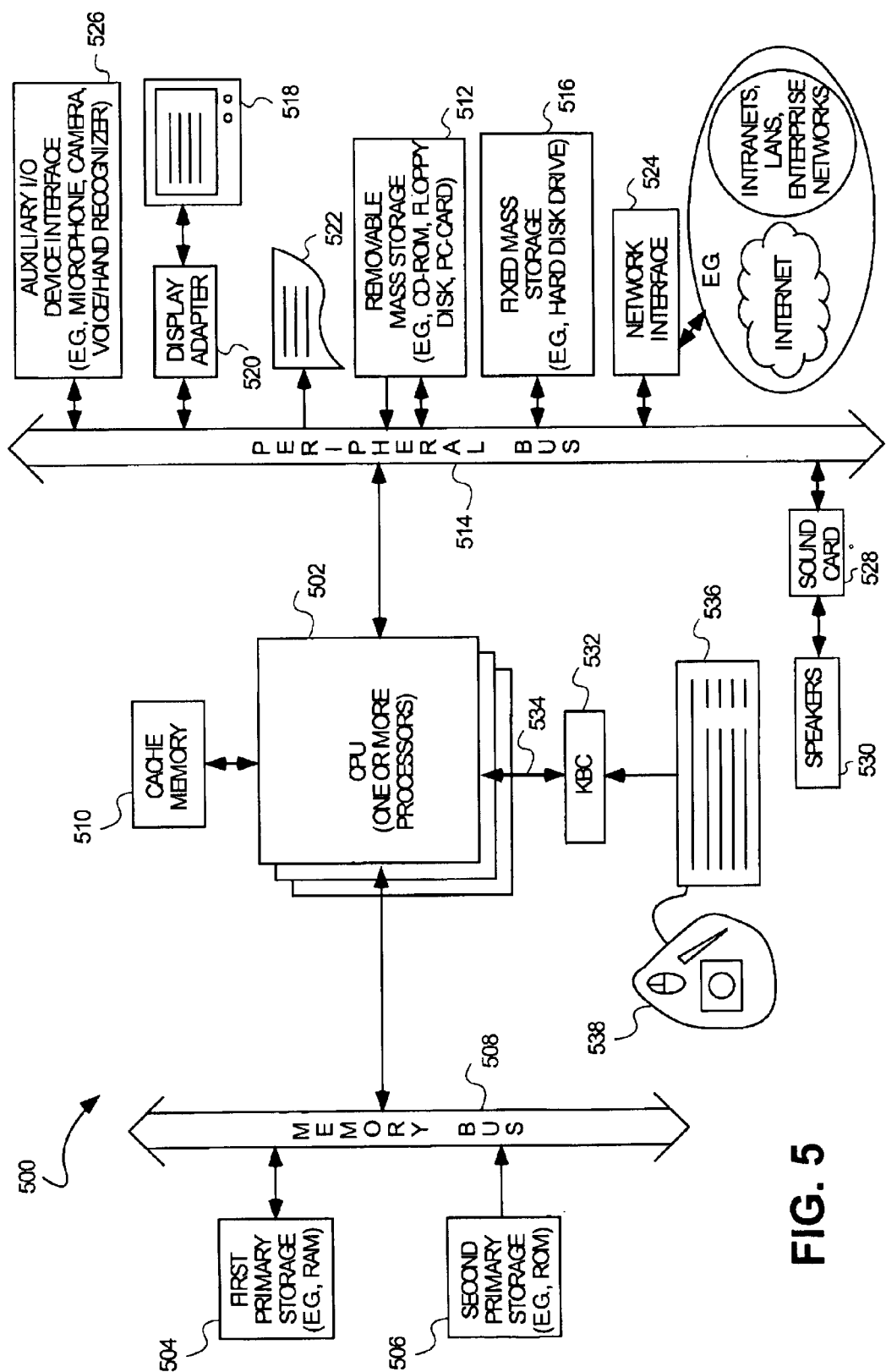
FIG. 5 is a block diagram of a typical computer system suitable for implementing an embodiment of the present invention.

FIG. 5 is a block diagram of a general purpose computer system 500 suitable for carrying out the processing in accordance with one embodiment of the present invention. FIG. 5 illustrates one embodiment of a general purpose computer system. Other computer system architectures and configurations can be used for carrying out the processing of the present invention. Computer system 500, made up of various subsystems described below, includes at least one microprocessor subsystem (also referred to as a central processing unit, or CPU) 502. That is, CPU 502 can be implemented by a single-chip processor or by multiple processors. It should be noted that in re-configurable computing systems, CPU 502 can be distributed amongst a group of programmable logic devices. In such a system, the programmable logic devices can be reconfigured as needed to control the operation of computer system 500. In this way, the manipulation of input data is distributed amongst the group of programmable logic devices. CPU 502 is a general purpose digital processor which controls the operation of the computer system 500. Using instructions retrieved from memory, the CPU 502 controls the reception and manipulation of input data, and the output and display of data on output devices.

CPU 502 is coupled bi-directionally with a first primary storage 504, typically a random access memory (RAM), and uni-directionally with a second primary storage area 506, typically a read-only memory (ROM), via a memory bus 508. As is well known in the art, primary storage 504 can be used as a general storage area and as scratch-pad memory, and can also be used to store input data and processed data. It can also store programming instructions and data, in the form of client property values encapsulated with components in any type of persistent storage in addition to other data and instructions for processes operating on CPU 502, and is typically used for fast transfer of data and instructions in a bi-directional manner over the memory bus 508. Also as well known in the art, primary storage 506 typically includes basic operating instructions, program code, data and objects used by the CPU 502 to perform its functions. Primary storage devices 504 and 506 may include any suitable computer-readable storage media, described below, depending on whether, for example, data access needs to be bi-directional or unidirectional. CPU 502 can also directly and very rapidly retrieve and store frequently needed data in a cache memory 510.

A removable mass storage device 512 provides additional data storage capacity for the computer system 500, and is coupled either bi-directionally or uni-directionally to CPU 502 via a peripheral bus 514. For example, a specific removable mass storage device commonly known as a CD-ROM typically passes data uni-directionally to the CPU 502, whereas a floppy disk can pass data bi-directionally to the CPU 502. Storage 512 may also include computer-readable media such as magnetic tape, flash memory, signals embodied on a carrier wave, PC-CARDS, portable mass storage devices, holographic storage devices, and other storage devices. A fixed mass storage 516 also provides additional data storage capacity and is coupled bi-directionally to CPU 502 via peripheral bus 514. The most common example of mass storage 516 is a hard disk drive. Generally, access to these media is slower than access to primary storages 504 and 506.

Mass storage 512 and 516 generally store additional programming instructions, data, and the like that typically are not in active use by the CPU 502. It will be appreciated that the information retained within mass storage 512 and 516 may be incorporated, if needed, in standard fashion as part of primary storage 504 (e.g. RAM) as virtual memory.

In addition to providing CPU 502 access to storage subsystems, the peripheral bus 514 is used to provide access other subsystems and devices as well. In the described embodiment, these include a display monitor 518 and adapter 520, a printer device 522, a network interface 524, an auxiliary input/output device interface 526, a sound card 528 and speakers 530, and other subsystems as needed.

The network interface 524 allows CPU 502 to be coupled to another computer, computer network, or telecommunications network using a network connection as shown. Through the network interface 524, it is contemplated that the CPU 502 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 502 can be used to connect the computer system 500 to an external network and transfer data according to standard protocols. That is, method embodiments of the present invention may execute solely upon CPU 502, or may be performed across a network such as the Internet, intranet networks, or local area networks, in conjunction with a remote CPU that shares a portion of the processing. Additional mass storage devices (not shown) may also be connected to CPU 502 through network interface 524.

Auxiliary I/O device interface 526 represents general and customized interfaces that allow the CPU 502 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 502 is a keyboard controller 532 via a local bus 534 for receiving input from a keyboard 536 or a pointer device 538, and sending decoded symbols from the keyboard 536 or pointer device 538 to the CPU 502. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 508, peripheral bus 514, and local bus 534 are illustrative of any interconnection scheme serving to link the subsystems. For example, a local bus could be used to connect the CPU to fixed mass storage 516 and display adapter 520. The computer system shown in FIG. 5 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, icons to delete rows and columns could exist or a they could be removed by specifying a size of 0; margins could be treated as a fixed strut column with an icon or not; the margin size field could exist or not; the grid lines OFF option might not exist or might not be associated with a "run-time" mode; and internal variables may be renamed or new ones may be added to simplify the reconstruction of the layout manager from persistent storage; and so forth. Accordingly, the present embodiments are to be considered as illustrative and not restrictive, and the invention is not to be limited to the details given herein, but may be modified within the scope and equivalents of the appended claims.

What is claimed is:

1. A method of managing the construction of a user interface having one or more components, the method comprising:

deriving values for a first set of properties for a first component in the user interface;

calculating a first position for the first component in the user interface and a first size for the first component using the first set of properties;

recalculating values for a second set of properties for a second component previously existing in the user interface; and storing the first set of properties with the first component in persistent storage.

2. A method as recited in claim 1 wherein deriving values for a first set of properties further includes receiving the first component from a component palette.

3. A method as recited in claim 1 wherein the first set of properties include a position set of properties and a size set of properties.

4. A method as recited in claim 1 wherein the first position and the first size are calculated upon receiving the first component from a component palette.

5. A method as recited in claim 1 wherein the values for the first set of properties are only integer values.

6. A method as recited in claim 1 wherein the first position and the first size are represented only by integer values.

7. A method as recited in claim 1 wherein calculating a first position and a first size further includes using a set of formulas containing properties from the first set of properties.

8. A method as recited in claim 7 wherein the set of formulas includes a first pair of formulas for calculating the first position and a second pair of formulas for calculating the first size.

9. A method as recited in claim 1 wherein storing the first set of properties further includes encapsulating the first set of properties and the first component.

10. A method as recited in claim 9 further including encapsulating the first position and the first size with the first component.

11. A method of representing a graphical user interface component having a size and a position in a user interface, the graphical user interface component being in a column having a column type, the method comprising:

associating a set of properties with the graphical user interface component, each property having an integer value, wherein the column type can be derived from the set of properties;

deriving a set of values corresponding to the size and the position of the graphical user interface component from the set of properties; and encapsulating the graphical user interface component with the set of properties and the set of values and storing the graphical user interface component.

12. A method as recited in claim 11 wherein associating a set of properties with the graphical user interface component further includes deriving values for the set of properties when the graphical user interface component is brought into the user interface from a graphical user interface component palette.

13. A method as recited in claim 11 wherein deriving a set of values further includes using a set of formulas having a first pair of formulas for calculating the size and a second set of formulas for calculating the position.

14. A method as recited in claim 13 wherein the size and position are integer values.

15. A method as recited in claim 11 further including reconstructing the user interface from the graphical user interface component encapsulated with the set of properties and the set of values.

16. A method as recited in claim 11 further including adding a row to the user interface dynamically.

17. A method as recited in claim 11 further including adding a column to the user interface dynamically.

18. A method as recited in claim 11 further including automatically resizing the column when the size of the user interface is changed.

19. A computer-readable medium containing programmed instructions arranged to manage the construction of a user interface having one or more components, the computer-readable medium containing programmed instructions for:

deriving values for a first set of properties for a first component in the user interface;

calculating a first position for the first component in the user interface and a first size for the first component using the first set of properties;

recalculating values for a second set of properties for a second component previously existing in the user interface; and storing the first set of properties with the first component in persistent storage.

20. A computer-readable medium containing programmed instructions arranged to represent a component having a size and a position in a user interface, the computer-readable medium containing programmed instructions for:

associating a set of properties with the component, each property having an integer value, wherein the column type can be derived from the set of properties;

deriving a set of values corresponding to the size and the position of the component from the set of properties; and encapsulating the component with the set of properties and the set of values before storing the component.

21. An apparatus for managing the construction of a user interface having one or more components, the apparatus comprising:

a means for deriving values for a first set of properties for a first component in the user interface;

a means for calculating a first position for the first component in the user interface and a first size for the first component using the first set of properties;

a means for recalculating values for a second set of properties for a second component previously existing in the user interface; and a means for storing the first set of properties with the first component in persistent storage.

* * * * *